May 22, 1934.  H. S. BRADY ET AL  1,959,811
PNEUMATIC GLASS FEEDER
Original Filed Oct. 10, 1931
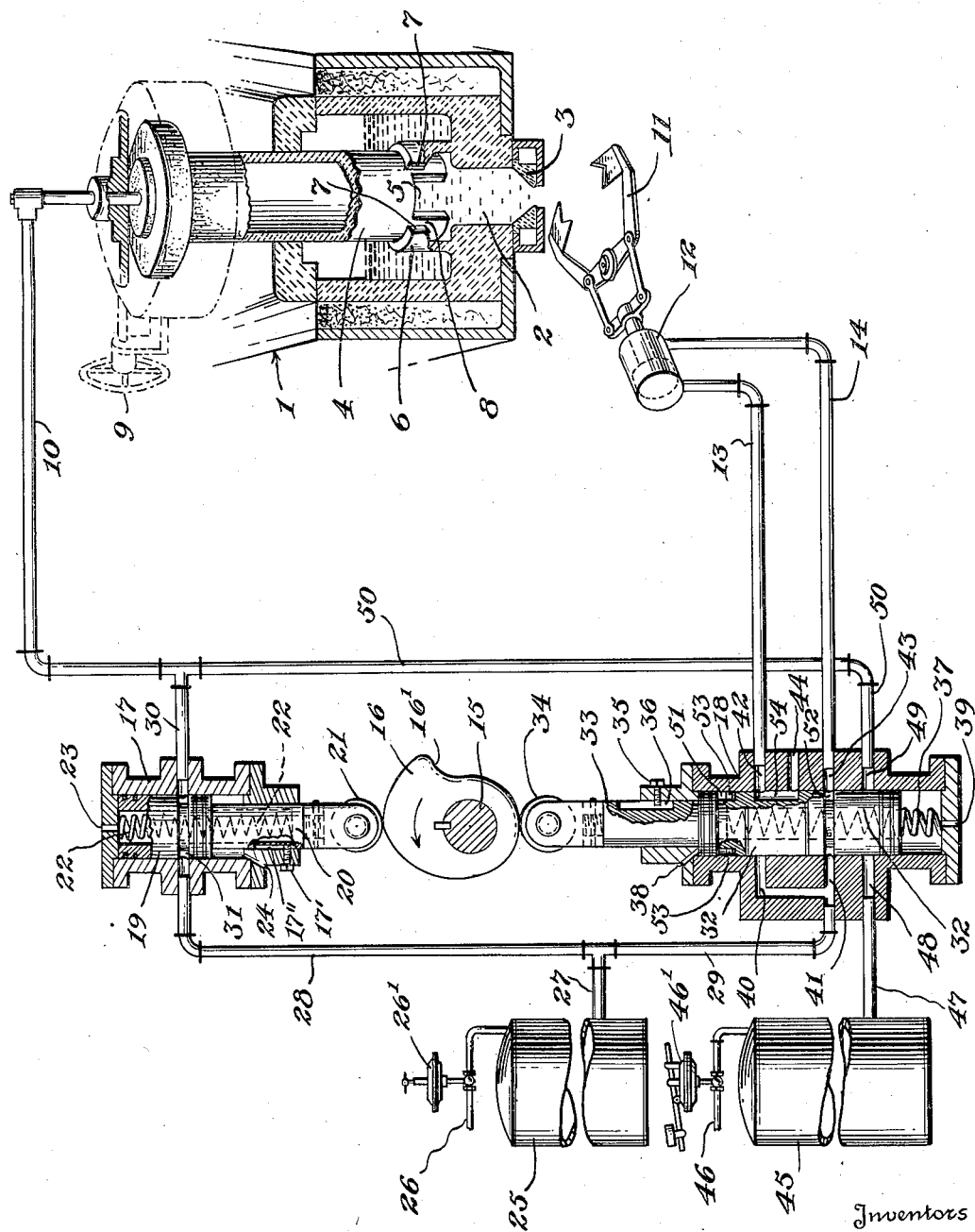
Inventors
Hugh S. Brady
Ira H. Freese
Howard R. Eccleston
By Eccleston & Eccleston
Attorneys Patented May 22, 1934

1,959,811

UNITED STATES PATENT OFFICE 1,959,811

PNEUMATIC GLASS FEEDER

Hugh S. Brady, Wheeling, Ira H. Freese, Clarksburg, W. Va., and Howard R. Eccleston, Washington, D. C., assignors to Hazel-Atlas Glass Company, Wheeling, W. Va., a corporation of West Virginia Continuation of application Serial No. 568,134, October 10, 1931. This application September 29, 1932, Serial No. 635,422

7 Claims. (Cl. 49—55)

The invention relates to an apparatus for feeding glass charges to the molds of a forming machine, to be formed into glass articles. The present feeder is of the air pressure type, in which the charges are formed in suspension by alternate plus and minus pressures; the general type being illustrated by Hitchcock Patent No. 805,068, November 21, 1905. For convenience, the plus and minus pressures are referred to herein as pressure and vacuum, respectively.

The purpose of the present invention is to greatly simplify the structure and operation of glass feeders of the air pressure type, to make their operation more uniform and certain, to provide an apparatus which requires little attention by the operator, and which is inexpensive both in manufacture and in operation.

Prior feeders have been rather complex in construction and operation, and their operation required considerable skill. Further, the many valves and other adjustments provided in the prior feeders were often adjusted without any real necessity therefor, which frequently resulted in loss of production. One of the objects of the present invention is to provide a feeder which is so simple in construction that its operation will be readily understood, and which will neither require nor permit of the many adjustments present in prior feeders, thereby assuring the production of uniform mold charges.

Other objects and advantages of the invention will be apparent to those skilled in the art from the following detailed description, when taken in connection with the accompanying drawing, in which:

The figure is a complete diagram of the feeder; parts being shown in vertical section and parts being shown in side elevation, and the shears being illustrated diagrammatically.

Referring to the drawing in more detail, numeral 1 indicates a conventional flow spout which receives the molten glass from a melting furnace (not shown). The bottom of the flow spout, adjacent its front end, is provided with the usual flow orifice 2, and removably mounted below the flow orifice is the ordinary orifice ring or bushing 3. In accordance with the established practice, the size of the orifice ring depends upon the particular work at hand.

Numeral 4 refers to an air bell or tube which is in alignment with the flow orifice, and which has its lower end immersed in the molten glass. The air bell extends to the floor of the flow spout, except for a clearance of a fraction of an inch. In the particular form herein illustrated, and which per se forms no part of the present invention, the lower end of the bell is cut away to form a port 5, which port preferably faces the front of the flow spout; i. e., it faces away from the melting furnace.

Surrounding the flow orifice and the lower end of the air bell 4, is a baffle or flange 6, which projects upwardly from, and is preferably formed integral with, the floor of the nose block, which is the term usually applied to the forward end portion of the flow spout. This baffle or flange 6 is of less height than the depth of the molten glass in the flow spout, but is of slightly greater height than that of the port 5. The baffle does not extend entirely around the lower end of the air bell, but ends some little distance from each side of the center line of the flow spout, as indicated by numerals 7, 7, to form a passage or port 8. This port also preferably faces the front end of the flow spout.

By rotatably adjusting the air bell the ports 5 and 8 may be brought into complete alignment, thereby providing a full volume flow of glass; or the air bell may be adjusted to any degree of alignment desired, to reduce the volume flow of glass to the desired extent. By this simple adjustment, the volume flow of glass may be accurately adjusted, thereby providing a very simple and efficient means for controlling the weight of the glass charges or gobs.

The air bell is rotatably adjusted in either direction by means of a hand wheel 9, and intermediate gear mechanism which need not be shown or described here, as mechanism for rotatably adjusting the air bell is fully disclosed in the application of David Stenhouse, Ser. No. 447,387, filed April 25, 1930, and per se forms no part of the present invention. Likewise, the particular construction of the air bell, and the baffle associated therewith, are shown and claimed in an application of James W. Ross, Ser. No. 618,569, filed June 21, 1932, and per se form no part of the present invention.

Connected with the upper end of the air bell is a pipe 10, by which air is alternately admitted to and exhausted from the air bell, to form the glass charges in the well-known manner. The apparatus for automatically controlling the admission and exhaust of air will be described hereinafter.

Arranged below the orifice bushing is a pair of conventional shears 11, which are diagrammatically illustrated. The shears are closed and opened by a cylinder 12; air pressure being admitted to the rear end of the cylinder by a pipe 13, and exhausted from the front end of the cylinder by a pipe 14, to close the shears; and air pressure being admitted to the front end of the cylinder by the pipe 14 and exhausted from the rear end of the cylinder by the pipe 13, to open the shears. The apparatus for automatically controlling the operation of the shear cylinder will be described hereinafter. The structure thus far described forms per se no part of the present invention. The present invention is preferably employed with the air bell construction disclosed herein, which as mentioned hereinbefore is the same as that disclosed in the Ross application, Ser. No. 618,569; but the invention is equally well adapted to use with the air bell construction disclosed in the Stenhouse application, or in the Good application, Ser. No. 180,281, filed April 1, 1927; or with any other preferred air bell construction, or other arrangement for controlling the volume flow of glass.

Numeral 15 refers to a cam shaft which is driven in timed relation with a glass forming machine, by any desired mechanism. Keyed or otherwise non-adjustably mounted on this shaft is a trip cam 16, which rotates continuously in the direction indicated by the arrow. It is to be noted that this single cam controls the pressure and vacuum in the air bell, and the air pressure for operating the shears, as will more clearly appear presently.

The trip cam 16 controls the operation of two piston valves, the casings of which are referred to by numerals 17 and 18.

Reciprocally mounted within the valve casing 17 is a valve head 19 having a valve stem 20. Rotation of the valve head and valve stem is prevented by means of a pin 17' which rides in a longitudinal slot 17'' provided in the valve stem. The free end of the valve stem is provided with a roller 21 which rides upon the cam 16. The valve stem is continuously urged in the direction of the cam by means of a coil spring 22 which is telescopically mounted within the valve head and valve stem, and which has its other end resting against the end of the valve casing. The ends of the valve casing are provided with vents 23 and 24 permitting constant communication between the atmosphere and the interior of the valve casing, at both ends, thereby preventing the accumulation of pressure in either end of the valve casing.

Numeral 25 refers to a pressure tank, to which air under pressure is supplied from any desired source by means of a pipe 26; the pipe being preferably provided with a conventional pressure regulator 26', for the purpose of maintaining uniform pressure. A pipe 27 leads from the lower portion of the pressure tank, and from this pipe lead two branches 28 and 29, the former connecting with the valve casing 17 and the latter connecting with the valve casing 18.

Leading from the valve casing 17, in the same plane as the entrance of pipe 28, is a pipe 30, which communicates with the pipe 10 leading to the top of the air bell 4. The valve head 19 is provided with a passage 31, and when the cam 16 has moved the valve head to the position shown in the drawing, this passage permits communication between pipes 28 and 30, whereby air under pressure from the pressure tank 26, flows directly into the upper end of the air bell. This pressure assists in the extrusion of the glass and the formation of the mold charge, in the well-known manner.

When the cam 16 rides from under the valve stem 20, the spring forces the valve head to a position to shut off communication between the pipes 28 and 30. This movement of the valve head merely shuts off communication between the pressure tank and the air bell, but does not release the pressure in the air bell. On the contrary, it seals the pressure in the air bell until it is released in due course by the application of vacuum controlled by the operation of the other valve, to be now described.

Reciprocally mounted within the valve casing 18 is a valve head 32, having a valve stem 33. The free end of the valve stem is provided with a roller 34 which rides upon the cam 16. Rotation of the valve head and valve stem is prevented by means of a pin 35 which rides in a longitudinal slot 36 provided in the valve stem. The valve stem is continuously urged in the direction of the cam by means of a coil spring 37 which is telescopically mounted within the hollow valve head, and which has its other end resting against the end of the valve casing. The ends of the valve casing are provided with vent holes 38 and 39 which permit constant communication between the atmosphere and the interior of the valve casing, at both ends, to prevent the accumulation of pressure in either end of the valve casing.

Communication between the pressure tank and the valve casing 18 is provided by means of the pipe 27 and its branch pipe 29. The valve body is provided with two connecting passages 40 and 41 which receive the air under pressure from the pipe 29. Aligning with these passages are passages 42 and 43, and leading from passage 42 is pipe 13 to the rear end of the shear cylinder 12, and leading from the passage 43 is pipe 14 leading to the front end of the shear cylinder. Intermediate the passages 42 and 43 is a passage 44 communicating with the atmosphere.

Numeral 45 refers to a vacuum tank communicating with any desired source of vacuum (not shown) by means of pipe 46, which is preferably provided with a conventional vacuum regulator 46'. A pipe 47 leads from the lower portion of the vacuum tank to a passage 48 in the valve body; and aligned with this passage 48 is a passage 49. Pipe 50 provides communication between the passage 49 and the pipe 10 leading to the air bell or tube 4.

The reciprocable valve head 32 is provided with a passage 51 which is adapted to align with passages 40 and 42 to permit air under pressure to flow to the rear end of shear cylinder 12, to close the shears. The valve head is also provided with a passage 52 which, in one position of the valve head, aligns with passages 41 and 43 to permit air under pressure to flow to the front end of the shear cylinder to open the shears, and which, in another position of the valve head aligns with passages 48 and 49 to open communication between the vacuum tank 45 and the interior of the air bell 4.

It will be noted that the valve head 32 is provided, on both sides, with cut-out portions 53 which communicate with the passage 51. These cut-out portions permit air pressure to be admitted to the rear end of the shear cylinder to close the shears for the purpose of severing the formed charge, shortly before passage 52 aligns with passages 48 and 49 to permit the application of vacuum to the interior of the air bell, for lifting the severed stub of glass.

The valve head is also provided with a longitudinally extending passage 54, which in one position of the valve head opens communication between passages 42 and 44, to open the rear end of the shear cylinder to atmosphere; and in the other position opens communication between passages 43 and 44, to open the front end of the shear cylinder to atmosphere.

Only a brief description of the operation of the feeder is necessary. With the parts in the position shown in the drawing, air under pressure from tank 25 flows through pipes 27 and 28 to valve casing 17, and thence through the valve head passage 31 to pipe 30 communicating with pipe 10, which leads to the interior of the air bell or tube 4. This pressure acting on the glass within the tube will accelerate the gravity flow of glass through the flow orifice. At the same time, the air under pressure from pipe 27 flows through pipe 29 to valve casing 18, and thence through the valve body passage 41, valve head passage 52, and valve body passage 43, to pipe 14 leading to the front end of the shear cylinder 12, to open and maintain open the shears 11; the pressure from the rear end of the cylinder being exhausted through pipe 13 to valve body passage 42 to valve head passage 54, and thence through valve body passage 44 to atmosphere. The parts will remain in this position for a period, the duration of which will depend upon the design of the cam 16.

The continued rotation of the cam will carry the cam shoulder 16' beyond the roller 21, thereby permitting spring 22 to force the valve head 19 downwardly. This movement of the valve head carries passage 31 out of alignment with pipes 28 and 30, thus cutting off further communication between the pressure tank and the interior of the air bell, and at the same time sealing in the air bell the air pressure previously supplied to it. This pressure remains in the air bell, until communication is opened with the vacuum tank.

The continued rotation of the cam 16 moves the valve head 32 downwardly. This movement first brings the cut-out portions 53 into register with the passages 40 and 42, thereby permitting air under pressure to flow from the pressure tank through pipes 27 and 29, passages 40, 51 and 42, to pipe 13, and thence to the rear end of shear cylinder 12 to close the shears and sever the formed charge; the front end of the cylinder being permitted to exhaust, by reason of passage 54 coming into register with passage 43, thereby opening communication with port 44 leading to atmosphere.

Slight further movement of the valve head in the same direction, caused by the continued rotation of the cam 16, brings passage 52 in alignment with passages 48 and 49, thereby opening communication between the vacuum tank 45 and the interior of the air bell 4, whereupon the air bell will be vacuumized to the desired degree, to lift the stub of glass which remains after the charge has been severed.

Continued rotation of the cam 16 carries the cam shoulder 16' beyond the roller 34 permitting the spring 37 to snap the valve head 32 upwardly. This upward movement restores the valve head to the position shown in the drawing, in which position air pressure is admitted to the front end of the shear cylinder to open the shears, the rear end of the cylinder exhausting to atmosphere; and in which position communication is shut off between the vacuum tank and the air bell, the minus pressure being sealed in the air bell until plus pressure is again admitted thereto.

Further rotation of the cam 16 causes the valve head 19 to be moved upwardly, against the pressure of spring 22, to the position shown in the drawing, thereby opening communication between the pressure tank and the air bell, and completing a cycle of operation. It will be understood that the entire cycle is completed in two seconds, at an ordinary speed of 30 charges per minute; the time of the cycle being correspondingly decreased at higher rates of production.

The apparatus is subject to many changes and modifications without departing from the spirit of the invention; and all such changes and modifications are intended to be included within the scope of the appended claims.

This application is a continuation of application Ser. No. 568,134, filed October 10, 1931.

What we claim as new is:

1. A glass feeder including a flow spout having a flow orifice, a tube projecting downwardly into the glass in the flow spout in substantial alignment with the flow orifice, shears arranged below the flow orifice for severing the formed charges, a cylinder for operating the shears, a valve periodically opening and closing communication between a source of pressure and the interior of said tube, a second valve periodically opening and closing communication between a source of vacuum and the interior of said tube and periodically admitting pressure to and exhausting pressure from opposite ends of the shear cylinder, and means for operating said valves.

2. A glass feeder including flow spout having a flow orifice, a tube projecting downwardly into the glass in the flow spout in substantial alignment with the flow orifice, shears arranged below the flow orifice for severing the formed charges, a cylinder for operating the shears, a valve periodically opening and closing communication between a source of pressure and the interior of said tube, a second valve periodically opening and closing communication between a source of vacuum and the interior of said tube and periodically admitting pressure to and exhausting pressure from opposite ends of the shear cylinder, and a single cam for operating both of said valves.

3. A glass feeder including flow spout having a flow orifice, shears arranged below the flow orifice for severing the formed charges, a cylinder for operating the shears, a valve periodically opening and closing communication between a source of pressure and the space above the glass over the flow orifice, a second valve periodically opening and closing communication between a source of vacuum and the space above the glass over the flow orifice and periodically admitting pressure to and exhausting pressure from opposite ends of the shear cylinder and a single cam for operating both valves.

4. A glass feeder including a flow spout having a flow orifice, a tube projecting downwardly into the glass in the flow spout in substantial alignment with the flow orifice, shears arranged below the flow orifice for severing the formed charges, a cylinder for operating the shears, two reciprocable valves, one of said valves controlling the admission of air pressure to said tube, the other of said valves controlling the application of vacuum to said tube and also controlling the operation of said shear cylinder, and a single cam controlling the operation of both of said reciprocable valves.

5. A glass feeder including a flow spout having a flow orifice, a tube projecting downwardly into the glass in the flow spout in substantial alignment with the flow orifice, shears arranged below the flow orifice for severing the formed charges, means for periodically applying pressure to said tube, and a single valve periodically applying vacuum to the tube and periodically operating said shears.

6. A glass feeder including a flow spout having a flow orifice, a tube projecting downwardly into the glass in the flow spout in substantial alignment with the flow orifice, shears arranged below the flow orifice for severing the formed charges, two valves controlling the operation of said shears and periodically opening communication between a source of pressure and the interior of said tube and between a source of vacuum and the interior of said tube, and means for operating the two valves.

7. A glass feeder including a flow spout having a flow orifice, a tube projecting downwardly into the glass in the flow spout in substantial alignment with the flow orifice, shears arranged below the flow orifice for severing the formed charges, two valves controlling the operation of said shears and periodically opening communication between a source of pressure and the interior of said tube and between a source of vacuum and the interior of said tube, and a single cam for operating the two valves.

HUGH S. BRADY.
IRA H. FREESE.
HOWARD R. ECCLESTON.